Aug. 14, 1923.
O. R. BRINEY
GUIDE BUSHING
Filed July 17, 1922
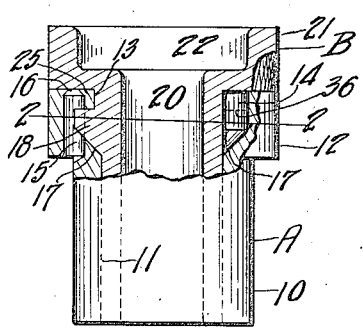
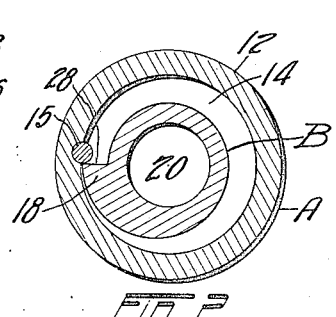
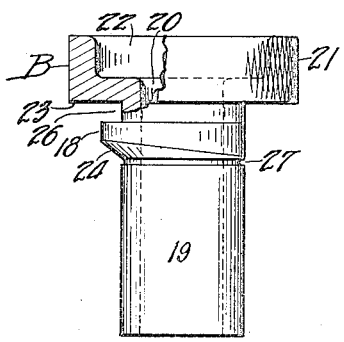
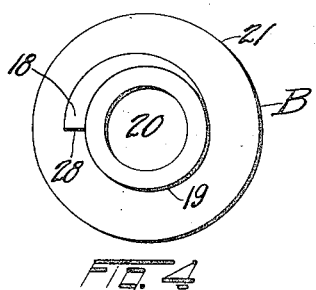
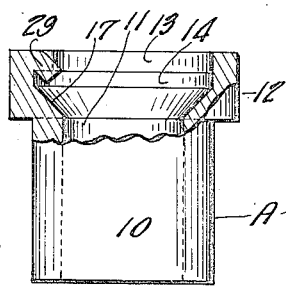
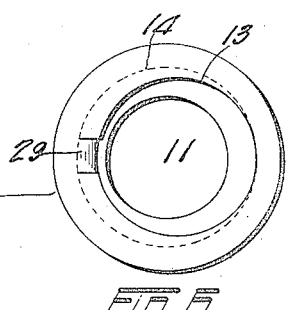
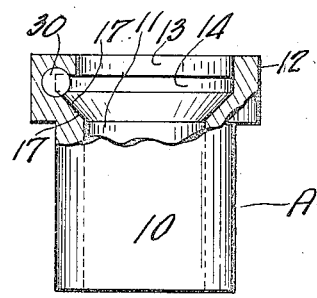
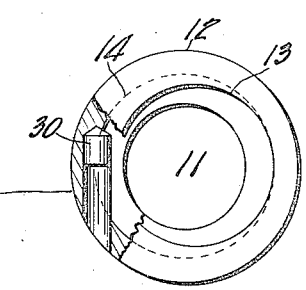
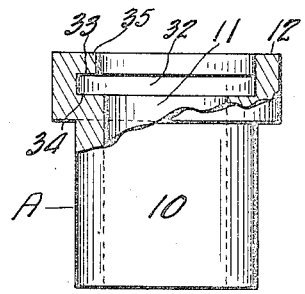
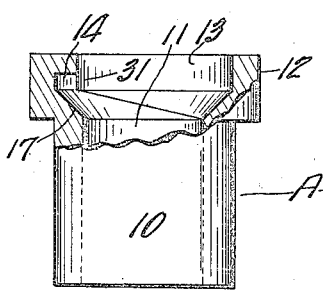
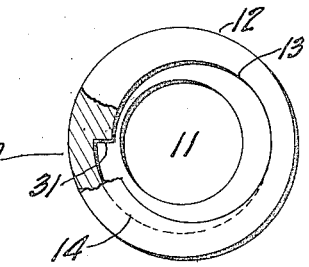
Inventor
O. R. Briney
By C. F. Meinkel
Attorney Patented Aug. 14, 1923.

1,465,236

UNITED STATES PATENT OFFICE.

OTTIS R. BRINEY, OF PONTIAC, MICHIGAN.

GUIDE BUSHING.

Application filed July 17, 1922. Serial No. 575,539.

*To all whom it may concern:*

Be it known that I, OTTIS R. BRINEY, a citizen of the United States, and a resident of Pontiac, county of Oakland, and State of Michigan, have invented a new and useful Improvement in Guide Bushings, of which the following is a specification.

My invention relates to guide bushings generally and to guide bushings for tools such as drills and reamers particularly.

The object of my invention is to provide a guide bushing which is simple of construction, in which a slip bushing is held to a liner bushing by a rotative movement between the two bushings, in which these bushings can not lock or wedge themselves to each other, and in which the slip bushing is prevented from rotary and from longitudinal movement in the liner bushing within certain limits.

Various mechanisms can be designed to accomplish my object; four being shown in the accompanying drawings in which Fig. 1 is a side view of a guide bushing having a liner bushing and a slip bushing, partly broken away to show plainly how these two bushings are held to each other; Fig. 2 is a section on line 2—2 of Fig. 1; Fig. 3 is a side view of a slip bushing adapted for all of the modifications of liner bushings shown and is partly broken away to show its interior plainly; Fig. 4 is a bottom end view of Fig. 3; Fig. 5 is a side view of a liner bushing partly broken away to plainly show another stop mechanism; Fig. 6 is a plan view of Fig. 5; Fig. 7 is a side view of a liner bushing partly broken away to plainly show still another stop mechanism; Fig. 8 is a plan view of Fig. 7, partly broken away to plainly show the stop mechanism; Fig. 9 is a side view of a liner bushing partly broken away to plainly show still another stop mechanism; Fig. 10 is a plan view of Fig. 9, partly broken away to plainly show the stop mechanism; Fig. 11 is a side view, partly broken away, of a liner bushing with a modified holding groove.

Similar reference characters refer to similar parts throughout the views.

In guide bushings it is important and very advantageous that the slip bushing be prevented from extensive longitudinal movement and also from rotative movement so that practically all of the wear takes place on the inner wall of the slip bushing and the slip bushing only needs to be replaced when worn.

An effective manner of locking a slip bushing to a liner bushing is an eccentric arrangement which, generally, is old but the older arrangements have the disadvantage of locking the bushings so tight to each other that considerable time and effort is consumed in releasing the bushings and often results either in considerable mar or in total destruction of one or both bushings.

The present invention aims to provide an easy engagement between the two bushings, a positive means to arrest the rotative movement between the two bushings without wedging, and a means to positively hold the bushings to each other longitudinally without wedging.

Referring now particularly to the drawings,

Figs. 1, 2, 3, and 4 show a guide bushing having the liner bushing A and the slip bushing B.

The liner bushing A has the body 10 provided with the concentric main bore 11 and the head 12 provided with the eccentric bore 13 and the concentric recess 14. The stop pin 15 is inserted substantially at the deepest point of the recess 14 and extends part way thereinto and the metal of the bushing A is peened over at 16 to prevent the pin 15 from working out.

It is preferred that the face 17 be beveled as shown so that chips or other matter which falls into this recess 14 may readily roll off and down through the bore 11. It is a time consuming and disagreeable operation to remove foreign matter from such a small recess which operation is eliminated by bevelling the face 17 thereby leaving no shoulder for foreign matter to rest on. Even if small particles of foreign matter do collect in the recess and are not removed, it will not interfere with the operation of the locking means since the parts fit loosely to each other and the general arrangement of the elements permits some foreign matter to be present in this recess without affecting the locking operation.

The eccentric bore 13 is sufficiently large and disposed at sufficient eccentricity to permit the eccentric flange 18 of the bushing B to enter when the same is so located, in relation to the bushing A, that the radially highest point of the flange 18 is substantially opposite the pin 15.

The slip bushing B has the body 19 adapted to fit into the main bore 11 of the bushing A and is provided with the concentric bore 20 adapted to whatever object it is proposed to guide. The bushing B further has the head 21 concentric with the body 19 and is provided with the lubricant chamber 22.

At proper distance from the face 23 of the head 21, the body 19 is provided with the previously mentioned eccentric flange 18 having the bevel face 24 substantially corresponding to the bevel face 17 and is otherwise adapted to enter the recess 14 and extends substantially to the highest point (radially) and forms the shoulder 28 there.

The flange 25 is adapted to enter the groove 26 and the groove 27 is provided to facilitate the grinding of the body 19.

It is noted here that with the arrangement of elements shown in Figs. 1, 2, 3, and 4, as well as those described later, there is no necessity of a close fit between the elements 17 and 24, or 18 and 14, or 25 and 26, as previously mentioned, and all elements, except the bodies 10 and 19, need not fit closely; in fact it is preferred that they fit loosely so that no final finishing is required thereon and whatever distortion thereof may take place during the hardening or other operation on these bushings does not affect the working thereof. This arrangement of elements eliminates considerable time and expense in their production as well as in their operation and works fully as good as if all of the joints were closely fitted.

After the bushings are made up as set forth, the bushing B is first inserted into the bushing A with the flange 18 opposite the pin 15 as previously mentioned and indicated in light lines in Fig. 1 at 36. A right handed rotative movement of the bushing B then causes the flange 18 to enter the recess 14 and the flange 25 to enter the groove 26 and both continue to advance therein until the shoulder 28 abuts on the pin 15 which acts as a stop.

The rotative action of a drill or other tool will not produce any further rotative movement of the bushing B and all possibility of the bushings being wedged to each other is eliminated.

As long as the bushings are in the position shown in Figs 1 and 2, the flanges and grooves thereon will prevent longitudinal movement between the bushings except to the slight extent of loose fitting between them.

Such slight longitudinal movement does not affect the operation of the guide bushing since the bodies fit closely to each other diametrically and thereby guide a tool or other object to a desired position even if there is a limited longitudinal movement between the bushings.

When it is desired to remove the slip bushing, it is only necessary to partially rotate it left handed and lift it out of the liner bushing.

When it is desired to use these guide bushings for left handedly rotating tools or objects, the flange 18 is formed on the side opposite to that shown in Fig. 2.

Figs. 5 and 6 show a guide bushing having all of the features of the one first shown and described. In this instance, however, the rotative movement of the bushing B is arrested by the stop 29 which is formed by bending a portion of the flange 25 downward in place of the pin 15.

Figs. 7 and 8 show a guide bushing having all of the features of the one first shown and described. In this instance, however, the rotative movement of the bushing B is arrested by the stop pin 30 which is inserted in the head 12 as shown.

Figs. 9 and 10 show a guide bushing having all of the features of the one first shown and described. In this instance, however, the shoulder 31 is formed directly in the bushing A, but the formation of this shoulder is somewhat expensive.

Fig. 11 shows a liner bushing having the recess 32 equivalent to the recess 14 but having its walls 33 and 34 parallel instead of the inclined wall 17. In this instance the eccentric flange 35 must also have parallel sides instead of the one bevel side 24. As previously stated, the recess shown here has the disadvantage of time consuming cleaning and is recommended only when a bevel bottom recess can not be carried out. Any of the stop means shown may be employed in connection with this recess.

I am aware that, prior to my invention, guide bushings have been made with rotary locking means. I therefore do not claim such feature broadly; but

I claim:—

1. A guide bushing comprising, a liner bushing provided with a concentric bore and a concentric recess adjacent this bore and an eccentric counterbore adjacent this recess, a stop means traversing said recess, a slip bushing provided with a concentric bore, an eccentric flange on said slip bushing and adapted to said recess, and a stop shoulder on said eccentric flange to engage said stop means.

2. A guide bushing comprising, a liner bushing provided with a concentric bore and a concentric recess adjacent this bore and an eccentric counterbore adjacent this recess forming a flange at one side of this recess, a stop means traversing said recess at said flange, a slip bushing provided with a head and a concentric bore, an eccentric flange on said slip bushing and adapted to said recess and forming a groove between said head and this eccentric flange at one side to engage said flange on said liner bushing, and a stop shoulder on said eccentric flange to engage said stop means.

3. A guide bushing comprising, a liner bushing provided with a recess having an inclined bottom wall and an obstruction therein, and a slip bushing provided with an eccentric flange adapted to said recess and to said inclined wall therein and having a shoulder adapted to abut on said obstruction.

4. A guide bushing comprising, a liner bushing provided with a concentric bore and a concentric recess having its lower wall inclined and an eccentric counterbore, a stop means traversing said recess, a slip bushing provided with a concentric bore, an eccentric flange on said slip bushing and adapted to said recess and the lower wall thereof inclined and engaging said inclined wall of said recess, and a stop shoulder on said eccentric flange to engage said stop means.

5. A guide bushing comprising, a liner bushing provided with a recess having its lower wall inclined and having an obstruction therein, and a slip bushing provided with an eccentric flange loosely fitting into said recess and to said inclined wall therein and having a shoulder adapted to abut on said obstruction.

OTTIS R. BRINEY.